United States Patent
Eskelinen et al.

(10) Patent No.: US 9,198,146 B2
(45) Date of Patent: Nov. 24, 2015

(54) SYNCHRONIZATION

(71) Applicant: Broadcom Corporation, Irvine, CA (US)

(72) Inventors: Ville Antero Eskelinen, Halikko (FI); Kaj Tapio Jansen, Salo (FI)

(73) Assignee: BROADCOM CORPORATION, Irvine, CA (US)

( * ) Notice: Subject to any disclaimer, the term of this patent is extended or adjusted under 35 U.S.C. 154(b) by 126 days.

(21) Appl. No.: 14/039,274

(22) Filed: Sep. 27, 2013

(65) Prior Publication Data
US 2015/0092572 A1 Apr. 2, 2015

(51) Int. Cl.
*H04L 12/26* (2006.01)
*H04W 56/00* (2009.01)
*H04L 5/14* (2006.01)
*H04W 24/10* (2009.01)

(52) U.S. Cl.
CPC ............... *H04W 56/001* (2013.01); *H04L 5/14* (2013.01); *H04W 56/0035* (2013.01)

(58) Field of Classification Search
CPC .................................................... H04W 24/04
USPC .......................................................... 370/252
See application file for complete search history.

(56) References Cited

U.S. PATENT DOCUMENTS

| 7,013,140 | B2 | 3/2006 | Ostberg et al. |
| 8,391,862 | B1 | 3/2013 | Harju |
| 8,498,638 | B2 | 7/2013 | Farnsworth et al. |
| 2007/0086349 | A1* | 4/2007 | Liu ............................. 370/241 |
| 2008/0220778 | A1 | 9/2008 | Ekstedt et al. |
| 2008/0291086 | A1* | 11/2008 | Walley et al. ................. 342/367 |
| 2014/0269353 | A1* | 9/2014 | Yang et al. .................... 370/252 |

FOREIGN PATENT DOCUMENTS

| WO | 2007103991 | 9/2007 |
| WO | 2010/031725 | 3/2010 |
| WO | 2011/069867 | 6/2011 |

* cited by examiner

*Primary Examiner* — Wei Zhao
(74) *Attorney, Agent, or Firm* — Oblon, McClelland, Maier & Neustadt, L.L.P.

(57) ABSTRACT

In a method for use by a user equipment of a communication network system, a signal strength received from a target signal which is transmitted from an access network of the communication network system, is measured at a frequency of a reception filter of the user equipment, the frequency corresponding to a frequency channel number. The signal strength measured is compared with a predetermined threshold. In case the signal strength measured is below the predetermined threshold, the frequency channel number is incremented by S, S being an integer equal to or greater than 2.

18 Claims, 3 Drawing Sheets

SYNCHRONIZATION

BACKGROUND OF THE INVENTION

1. Field of the Invention

The present invention relates to synchronization of a user equipment of a communication network system complying with a wide band communication system with small frequency channel spacing, e.g. LTE and/or WCDMA systems.

2. Related Background Art

Prior art which is related to this technical field can e.g. be found in:

[1] U.S. Pat. No. 8,391,862 B1
[2] U.S. Pat. No. 7,013,140 B2
[3] WO 11 069 867 A1
[4] WO 10 031 725 A1
[5] U.S. Pat. No. 8,498,638 B1
[6] US 2008/220 778 A1
[7] WO 07 103 991 A2

The following meanings for the abbreviations used in this specification apply:

EARFCN EUTRA Absolute Radio Frequency Channel Number
eNB evolved NodeB
EUTRA Evolved Universal Mobile Telecommunications System Terrestrial Radio Access
FDD Frequency Division Duplex
LTE Long Term Evolution
NB NodeB
P-SCH Primary Synchronization Channel
PSS Primary Synchronization Signal
RF Radio Frequency
RSSI Received Signal Strength Indication
SSS Secondary Synchronization Signal
TDD Time Division Duplex
UARFCN UTRA Absolute Radio Frequency Channel Number
UE User Equipment
UTRA Universal Mobile Telecommunications System Terrestrial Radio Access
WCDMA Wideband Code Division Multiple Access A user equipment (UE) wishing to access a communication network may have to perform an initial synchronization/band search procedure e.g. when the UE is turned on and a cell of the communication network has not been found on a previously known cell list. For example, a Band 1 (2110 MHz to 2170 MHz) has 600 EUTRAN center frequencies or 300 for WCDMA. In the band search procedure, the user equipment has to try the initial synchronization sequentially on every frequency.

With the introduction of new bands and new systems (e.g. LTE FDD and LTE TDD), time spent by the user equipment on initial synchronization has increased. For example, trying initial synchronization on a 60 MHz band may take 10 seconds.

SUMMARY OF THE INVENTION

The present invention aims at overcoming the above problem. For example, the present invention aims at shortening time required for initial synchronization/band search procedure.

According to an aspect of the invention, this is achieved by a method for use by a user equipment of a communication network system. The method comprises measuring a signal strength received from a target signal which is transmitted from an access network of the communication network system, at a frequency of a reception filter of the user equipment, the frequency corresponding to a frequency channel number, comparing the signal strength measured with a predetermined threshold, and, in case the signal strength measured is below the predetermined threshold, incrementing the frequency channel number by S, S being an integer equal to or greater than 2.

According to another aspect of the invention, an apparatus is provided which comprises at least one processor and at least one memory including computer program code, the at least one memory and the computer program code configured to, with the at least one processor, cause the apparatus at least to perform measuring a signal strength received from a target signal which is transmitted from an access network of the communication network system, at a frequency of a reception filter, the frequency corresponding to a frequency channel number, comparing the signal strength measured with a predetermined threshold, and, in case the signal strength measured is below the predetermined threshold, incrementing the frequency channel number by S, S being an integer equal to or greater than 2.

The invention may also be implemented by a storage medium.

In the following the invention will be described by way of example embodiments thereof with reference to the accompanying drawings.

DESCRIPTION OF THE EXAMPLE EMBODIMENTS

Figure 1:
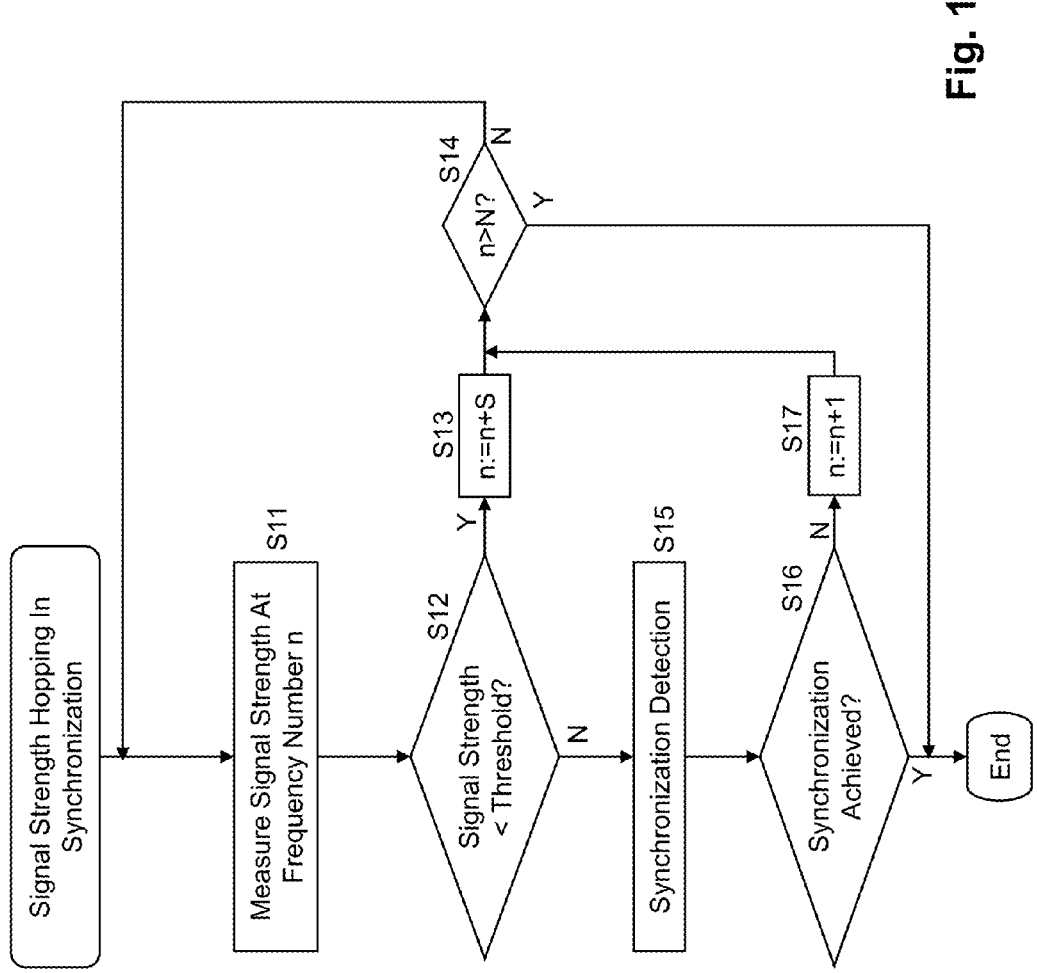
FIG. 1 shows a flowchart illustrating a process of signal strength hopping in synchronization according to an example embodiment of the invention.

FIG. 1 shows a flowchart illustrating a process of signal strength hopping in synchronization according to an example embodiment of the invention. The process may be performed by a UE of a communication network system.

It is assumed that the UE wishes to perform synchronization (e.g. initial synchronization)/band search for achieving access to a communication network of the communication network system complying e.g. with LTE FDD and/or LTE TDD and/or WCDMA systems. In general, any wide band system with small frequency channel spacing can be used.

In step S11, a signal strength received from a target signal which is transmitted from an access network of the communication network system is measured at a frequency (radio frequency) of a reception filter (RF filter) of the user equipment, the frequency corresponding to a frequency channel number. The access network provides access to the communication network. According to an example embodiment, the access network comprises a base station, a NodeB (NB) or an eNodeB (eNB). The frequency channel number n with which the process is started is set to an appropriate value. According to an implementation example of the invention, the signal strength comprises an RSSI, and the frequency channel number comprises an EARFCN or a UARFCN.

The RF filter of the user equipment can be tuned to a plurality of frequencies (center frequencies) corresponding to the respective frequency channel number, and is set to a bandwidth which is appropriate for receiving the target signal. For example, the filter bandwidth is set to correspond to the target signal bandwidth.

Further, according to an implementation example of the invention, in step S11 a signal strength measurement is performed. Alternatively, according to another implementation example, in step S11 channel correlation at the frequency with the target signal is performed simultaneously with the signal strength measurement. The channel correlation may comprise a P-SCH correlation. Alternatively, the channel correlation may comprise a first part of the P-SCH correlation in which the signal strength is measured when the frequency has settled.

In step S12, the signal strength measured in step S11 is compared with a predetermined threshold.

In case the comparison in step S12 results in that the signal strength is below the predetermined threshold, in step S13 the frequency channel number n is incremented by S, S being an integer equal to or greater than 2.

In step S14 it is checked whether the frequency channel number n has exceeded a total number N of frequency channel numbers. If n does not exceed N, the process returns to step S10. If n exceeds N, the process ends. In other words, steps S11 to S13 are repeated as long as the signal strength measured is below the predetermined threshold and n does not exceed N.

According to an implementation example, in order to avoid leaping a center frequency of the target signal, increment S is set about half of a bandwidth of the target signal, e.g. equal to or lower than half of the bandwidth of the target signal, and the predetermined threshold is set at RF ground noise level. According to an implementation example, the threshold is set few dB higher than RF noise floor. For example, the threshold is set to −100 dBm or −99 dBm.

Figure 2:
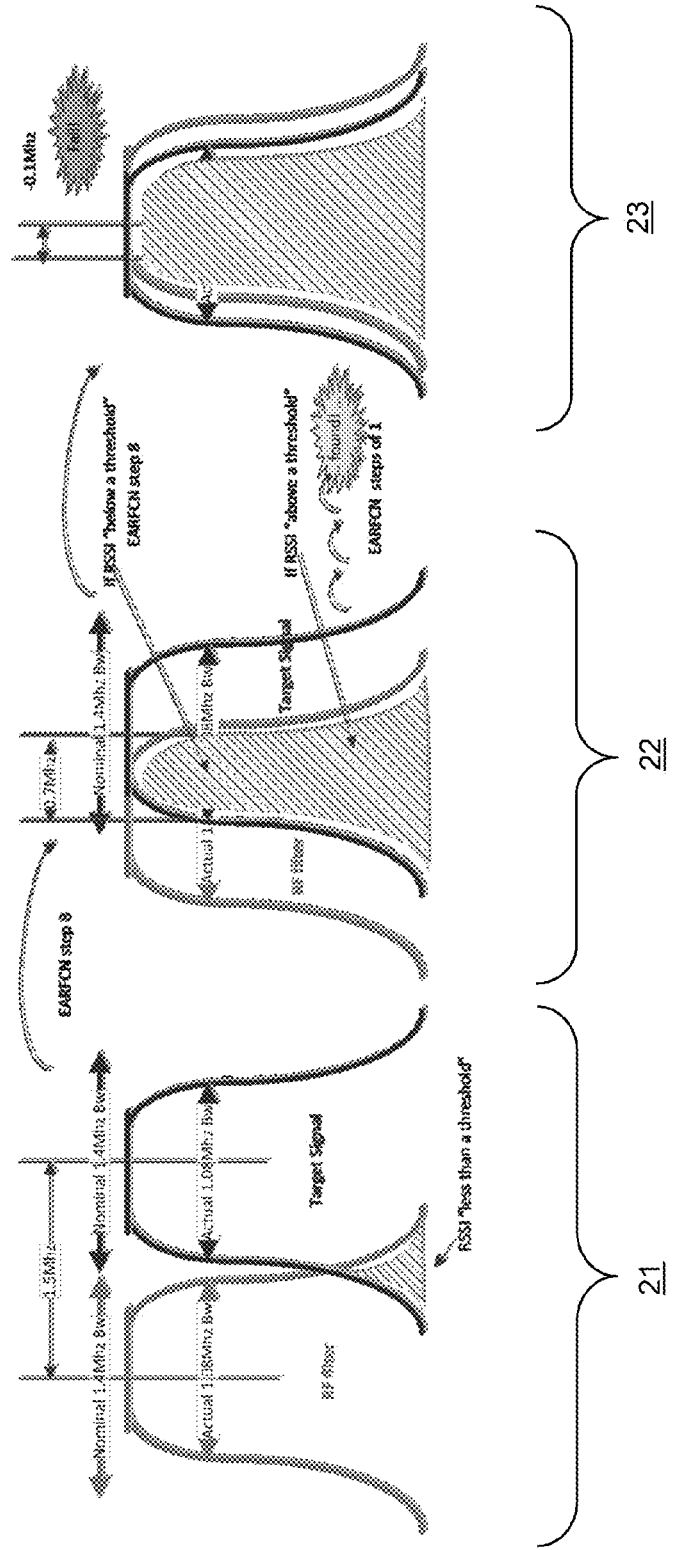
FIG. 2 shows a diagram illustrating channel correlation and signal strength hopping based on the process depicted in FIG. 1 according to an example embodiment of the invention.

For illustrating an effect of the above process, reference is made to an example in FIG. 2. On the left, FIG. 2 illustrates a first measurement 21 using an RF filter with a nominal bandwidth of 1.4 MHz and an actual bandwidth of 1.08 MHz for correlation with the target signal of a nominal bandwidth of 1.4 MHz and an actual bandwidth of 1.08 MHz. The center frequencies of the RF filter and the target signal are spaced apart by 1.5 MHz, and the RSSI measured is determined to be less than the threshold.

Thus, the frequency channel number is incremented by S which in the case of FIG. 2 is set to S=8. It is to be noted that in the case depicted in FIG. 2, S may instead be set to 5, 6 or 7. Further, some EUTRAN bands have only 5 MHz or larger bandwidths, in which case S can be set to S>20.

As a result, in a second measurement 22 shown in the middle of FIG. 2, the center frequency of the RF filter differs from the center frequency of the target signal by 0.7 MHz. Now in case the RSSI measured is determined to be less than the threshold, the frequency channel number again is incremented by S which results in a third measurement 23 shown on the right in FIG. 2. In the third measurement 23, the center frequency of the RF filter differs from the center frequency of the target signal by −0.1 MHz which means that synchronization of the UE with the target signal fails.

Otherwise, in case the RSSI measured in the second measurement 22 is determined to be not less than the threshold, the frequency channel number is not incremented by S.

Referring again to FIG. 1, in case the comparison in step S12 results in that the signal strength is not below the predetermined threshold, the process proceeds to step S15 in which channel correlation at the frequency for detecting synchronization with the target signal at the frequency of frequency channel number n is performed. According to an implementation example, the channel correlation comprises a P-SCH correlation and an S-SCH correlation, e.g. in case an RSSI measurement is performed in step S11. Alternatively, the channel correlation comprises an S-SCH correlation, e.g. in case P-SCH correlation is performed simultaneously with the RSSI measurement in step S11. Still alternatively, the channel correlation comprises a second part of a P-SCH correlation and an S-SCH correlation, e.g. in case a first part of the P-SCH correlation is performed in step S11. For the synchronization detection, step S15 may further comprise receipt of system information from a broadcast channel, e.g. P-BCH in EUTRAN.

In step S16 it is detected whether synchronization with the target signal is achieved. In case it is detected in S16 that synchronization with the target signal is not achieved at the frequency of frequency channel number n, the process proceeds to step S17 in which n is incremented by 1. Otherwise, in case synchronization is detected, the process ends.

After step S17, step S14 follows in which it is checked whether the frequency channel number n has exceeded the total number N of frequency channel numbers. If n does not exceed N, the process returns to step S10. If n exceeds N, the process ends. In other words, steps S10 to S12 and S15 to S17 are repeated as long as the signal strength measured is not below the predetermined threshold, the synchronization with the target signal is not achieved and n does not exceed N.

Again referring to FIG. 2, in the second measurement 22, in case the frequency channel number is incremented by increments of 1 for the following measurements, finally synchronization with the target signal can be achieved.

In some embodiments, with the process illustrated in FIG. 1, speed for achieving initial synchronization with a target signal can be improved, e.g. by a factor between four to ten depending inter alia on the threshold, in particular in bands which are not "full".

Figure 3:
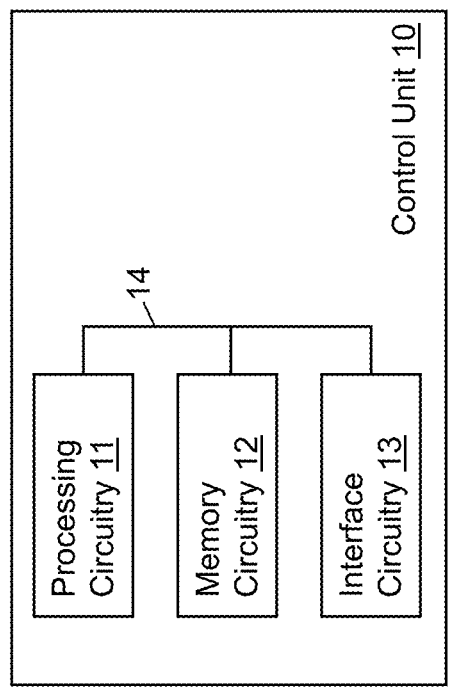
FIG. 3 shows a schematic block diagram illustrating a configuration of a control unit in which some embodiments of the invention are implementable.

Now reference is made to FIG. 3 for illustrating a simplified block diagram of a control unit 10 suitable for use in practicing some embodiments of this invention. According to an implementation example of the invention, the control unit 10 is part of and/or used by a UE.

The control unit 10 comprises a processing circuitry 11 including one or more processors and a memory circuitry 12 including one or more memories. Optionally, the control unit 10 includes an interface circuitry 13, and the processing circuitry 11, memory circuitry 12 and interface circuitry 13 are coupled by a link 14. According to an implementation example of the invention, the memory circuitry 12 stores a program. The interface circuitry 13 comprises a suitable radio frequency (RF) transceiver coupled to one or more antennas (not shown) for bidirectional wireless communications over one or more wireless links (not shown) with a communication network. According to an implementation example of the invention, the RF filter of the user equipment is implemented by the RF transceiver.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The program stored by the memory circuitry is assumed to include program instructions that, when executed by the processing circuitry, enable the control unit 10 to operate in accordance with the example embodiments of this invention, as detailed above. Inherent in the processing circuitry is a clock to enable synchronism among the various apparatus for transmissions and receptions within the appropriate time intervals and slots required, as the scheduling grants and the granted resources/subframes are time dependent. The transceivers include both transmitter and receiver, and inherent in each is a modulator/demodulator commonly known as a modem.

In general, the example embodiments of this invention may be implemented by computer software stored in the memory circuitry 12 and executable by the processing circuitry 11, or by hardware, or by a combination of software and/or firmware and hardware.

In general, the various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory circuitry 12 may be of any type suitable to the local technical environment and may be implemented using any suitable data storage technology, such as semiconductor-based memory devices, magnetic memory devices and systems, optical memory devices and systems, fixed memory and removable memory. The processing circuitry may be of any type suitable to the local technical environment, and may include one or more of general purpose computers, special purpose computers, microprocessors, digital signal processors (DSPs) and processors based on a multi-core processor architecture, as non-limiting examples.

Further, as used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to an aspect of the invention, an apparatus for use by a user equipment of a communication network system is provided. The apparatus may comprise and/or use the control unit 10.

The apparatus comprises means for measuring a signal strength received from a target signal which is transmitted from an access network of the communication network system, at a frequency of a reception filter of the user equipment, the frequency corresponding to a frequency channel number, means for comparing the signal strength measured with a predetermined threshold, and means for, in case the signal strength measured is below the predetermined threshold, incrementing the frequency channel number by S, S being an integer equal to or greater than 2.

According to an example embodiment of the invention, the means for measuring comprise means for performing channel correlation at the frequency with the target signal.

According to an example embodiment of the invention, the channel correlation comprises at least part of a primary synchronization channel correlation.

According to an example embodiment of the invention, the apparatus comprises means for repeating performing the measuring and comparing the signal strength, and incrementing the frequency channel number by S as long as the signal strength measured is below the predetermined threshold.

According to an example embodiment of the invention, the apparatus comprises means for, in case the signal strength measured is not below the predetermined threshold, performing channel correlation at the frequency for detecting whether synchronization with the target signal is achieved at the frequency, wherein the means for incrementing, in case synchronization with the target signal is not achieved at the frequency, increment the frequency channel number by 1.

According to an example embodiment of the invention, the apparatus comprises means for, in case the signal strength measured is not below the predetermined threshold, performing channel correlation at the frequency for detecting whether synchronization with the target signal is achieved at the frequency, wherein the means for incrementing, in case synchronization with the target signal is not achieved at the frequency, increment the frequency channel number by 1, and means for repeating measuring and comparing the signal strength, performing channel correlation and incrementing the frequency channel number by 1 as long as the signal strength measured is not below the predetermined threshold and the synchronization with the target signal is not achieved.

According to an example embodiment of the invention, the channel correlation comprises at least part of a primary synchronization channel correlation and/or a secondary synchronization channel correlation.

According to an example embodiment of the invention, the apparatus comprises means for setting S equal to or lower than half of a bandwidth of the target signal.

According to an example embodiment of the invention, the apparatus comprises means for setting S equal to 5, 6, 7 or 8, or greater than 20.

According to an example embodiment of the invention, the apparatus comprises means for setting the predetermined threshold at a radio frequency ground noise level.

According to an example embodiment of the invention, the apparatus comprises means for setting the predetermined threshold at −100 dBm or −99 dBm.

According to an example embodiment of the invention, the signal strength is a received signal strength indication (RSSI).

According to an example embodiment of the invention, the communication network system complies with long term evolution (LTE) and/or wideband code division multiple access (WCDMA) systems.

According to an example embodiment of the invention, the access network comprises at least one of the following group: an eNB, NB or a base station.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by a user equipment of a communication network system, the method comprising:
   measuring, by circuitry of the user equipment, a signal strength received from a target signal which is transmitted from an access network of the communication network system, at a first frequency of a reception filter of the user equipment, the first frequency corresponding to a first frequency channel number;
   comparing, by the circuitry, the signal strength measured with a predetermined threshold; and
   when the signal strength measured is below the predetermined threshold, incrementing the frequency channel number by S to a second frequency channel number which corresponds to a second frequency of the reception filter, S being an integer equal to or greater than 2, and measuring a signal strength received from a target signal which is transmitted from an access network of the communication network at the second frequency, and
   when the signal strength measured is not below the predetermined threshold, performing channel correlation at the first frequency for detecting whether synchronization with the target signal is achieved at the first frequency.

2. The method of claim 1, wherein the channel correlation comprises at least part of a primary synchronization channel correlation.

3. The method of claim 1, comprising:
   repeating performing the measuring and comparing the signal strength, and incrementing the frequency channel number by S as long as the signal strength measured is below the predetermined threshold.

4. The method of claim 1, comprising:
   when the signal strength measured is not below the predetermined threshold,
   and when synchronization with the target signal is not achieved at the first frequency, incrementing the frequency channel number by 1 to a third frequency channel number which corresponds to a third frequency that is between the first frequency and the second frequency.

5. The method of claim 4, wherein the channel correlation comprises at least part of a primary synchronization channel correlation and/or a secondary synchronization channel correlation.

6. The method of claim 3, comprising:
   when the signal strength measured is not below the predetermined threshold after measuring and comparing the signal strength for a frequency corresponding to an incremented frequency channel number,
   performing channel correlation at the frequency for detecting whether synchronization with the target signal is achieved at the frequency corresponding to the last incremented frequency channel number;
   when synchronization with the target signal is not achieved at the frequency corresponding to the last incremented frequency channel number, incrementing the frequency channel number by 1; and
   repeating measuring and comparing the signal strength, performing channel correlation and incrementing the frequency channel number by 1 as long as the signal strength measured is not below the predetermined threshold and the synchronization with the target signal is not achieved.

7. The method of claim 6, wherein the channel correlation comprises at least part of a primary synchronization channel correlation and/or a secondary synchronization channel correlation.

8. The method of claim 1, comprising at least one of the following:
   setting S equal to or lower than half of a bandwidth of the target signal;
   setting S equal to 5, 6, 7 or 8, or greater than 20;
   setting the predetermined threshold at a radio frequency ground noise level;
   setting the predetermined threshold at −100 dBm or −99 dBm;
   the signal strength is a received signal strength indication (RSSI);
   the communication network system complies with long term evolution (LTE) and/or wideband code division multiple access (WCDMA) systems; and
   the access network comprises at least one of the following group: an eNB, NB or a base station.

9. A non-transitory storage medium readable by a computer of a user equipment of a communication network system, the storage medium storing a program for causing the computer to execute:
   measuring a signal strength received from a target signal which is transmitted from an access network of the communication network system, at a first frequency of a reception filter of the user equipment, the first frequency corresponding to a first frequency channel number;
   comparing the signal strength measured with a predetermined threshold; and
   when the signal strength measured is below the predetermined threshold, incrementing the frequency channel number by S to a second frequency channel number which corresponds to a second frequency of the reception filter, S being an integer equal to or greater than 2, and measuring a signal strength received from a target signal which is transmitted from an access network of the communication network at the second frequency, and
   when the signal strength measured is not below the predetermined threshold, performing channel correlation at the first frequency for detecting whether synchronization with the target signal is achieved at the first frequency.

10. An apparatus comprising:
    circuitry configured to
    measure a signal strength received from a target signal which is transmitted from an access network of the communication network system, at a first frequency of a reception filter of the user equipment, the first frequency corresponding to a first frequency channel number;
    compare the signal strength measured with a predetermined threshold; and
    when the signal strength measured is below the predetermined threshold, incrementing the frequency channel number by S to a second frequency channel number which corresponds to a second frequency of the reception filter, S being an integer equal to or greater than 2, and measure a signal strength received from a target signal which is transmitted from an access network of the communication network at the second frequency, and when the signal strength measured is not below the predetermined threshold, performing channel correlation at the first frequency for detecting whether synchronization with the target signal is achieved at the first frequency.

11. The apparatus of claim 10, wherein the channel correlation comprises at least part of a primary synchronization channel correlation.

12. The apparatus of claim 10, wherein the circuitry is configured to:

repeat performing the measuring and comparing the signal strength, and incrementing the frequency channel number by S as long as the signal strength measured is below the predetermined threshold.

13. The apparatus of claim 10, wherein when the signal strength measured is not below the predetermined threshold, and when synchronization with the target signal is not achieved at the first frequency, incrementing the frequency channel number by 1 to a third frequency channel number which corresponds to a third frequency that is between the first frequency and the second frequency.

14. The apparatus of claim 13, wherein the channel correlation comprises at least part of a primary synchronization channel correlation and/or a secondary synchronization channel correlation.

15. The apparatus of claim 12, wherein:

when the signal strength measured is not below the predetermined threshold after measuring and comparing the signal strength for a frequency corresponding to an incremented frequency channel number, the circuitry is configured to perform channel correlation at the frequency for detecting whether synchronization with the target signal is achieved at the frequency corresponding to the last incremented frequency channel number, and when synchronization with the target signal is not achieved at the frequency corresponding to the last incremented frequency channel number, the circuitry is configured to increment the frequency channel number by 1, and repeat measuring and comparing the signal strength, and perform channel correlation and incrementing the frequency channel number by 1 as long as the signal strength measured is not below the predetermined threshold and the synchronization with the target signal is not achieved.

16. The apparatus of claim 15, wherein the channel correlation comprises at least part of a primary synchronization channel correlation and/or a secondary synchronization channel correlation.

17. The apparatus of claim 10, wherein the circuitry is configured to:

set S equal to or lower than half of a bandwidth of the target signal;

set S equal to 5, 6, 7 or 8, or greater than 20;

set the predetermined threshold at a radio frequency ground noise level;

set the predetermined threshold at −100 dBm or −99 dBm, and/or wherein the signal strength is a received signal strength indication (RSSI).

18. The apparatus of claim 10, wherein the communication network system complies with long term evolution (LTE) and/or wideband code division multiple access (WCDMA) systems, and/or the access network comprises at least one of the following group: an eNB, NB or a base station, and/or the apparatus comprises a user equipment.

* * * * *